US00RE41067E

(19) United States
(12) Reissued Patent
Capella

(10) Patent Number: US RE41,067 E
(45) Date of Reissued Patent: Jan. 5, 2010

(54) SWITCH PLATE FRAME

(75) Inventor: Joaquin Aubert Capella, Barcelona (ES)

(73) Assignee: Simon, S.A., Barcelona (ES)

(21) Appl. No.: 29/210,607

(22) Filed: Aug. 3, 2004

Related U.S. Patent Documents

Reissue of:

(64) Patent No.: Des. 461,114
Issued: Aug. 6, 2002
Appl. No.: 29/152,465
Filed: Dec. 19, 2001

U.S. Applications:

(62) Division of application No. 29/139,867, filed on Apr. 6, 2001.

(30) Foreign Application Priority Data

Oct. 6, 2000 (ES) ..... 149529

(51) LOC (9) Cl. ..... 11-05

(52) U.S. Cl. ..... D8/353; D6/301; D6/300

(58) Field of Classification Search ..... D8/350–353; D13/177; D6/300, 301, 303, 309; 220/241; 174/66; 16/402

See application file for complete search history.

(56) References Cited

U.S. PATENT DOCUMENTS

| | | | | | |
|---|---|---|---|---|---|
| 3,689,868 | A | * | 9/1972 | Snyder | 439/501 |
| 5,073,681 | A | * | 12/1991 | Hubben et al. | 174/66 |
| D340,718 | S | * | 10/1993 | Leger et al. | D14/224 |
| D379,453 | S | * | 5/1997 | Fabrizi | D13/177 |
| D430,478 | S | * | 9/2000 | De brey et al. | D8/353 |
| 6,281,440 | B1 | * | 8/2001 | Baldwin et al. | 174/66 |

* cited by examiner

*Primary Examiner*—Stella W Reid
*Assistant Examiner*—Mark Goodwin
(74) *Attorney, Agent, or Firm*—Michael J. Striker

(57) CLAIM

The ornamental design for a switch plate, as shown and described.

DESCRIPTION

FIG. 1 is a top front and left side perspective view of [an inner frame for a single switch plate] *a switch plate frame showing my new design*;
FIG. 2 is a front view thereof;
FIG. 3 is a top plan view thereof;
FIG. 4 is a right side view thereof [which is a mirror image of the left side] *the left side view being a mirror image* thereof;
FIG. 5 is a rear view thereof;
FIG. 6 is a bottom plan view thereof;
FIG. 7 is a top front and left side perspective view of [an inner frame for a double switch plate] *a second embodiment of a switch plate frame showing my new design*;
FIG. 8 is a front view thereof;
FIG. 9 is a top plan view thereof;
FIG. 10 is a right side view thereof [which is a mirror image of the left side] *the left side view being a mirror image* thereof;
FIG. 11 is a rear view thereof;
FIG. 12 is a bottom plan view thereof;
FIG. 13 is a top front and left side perspective view of [an inner frame for a triple switch plate] *a third embodiment of a switch plate frame showing my new design*;
FIG. 14 is a front view thereof;
FIG. 15 is a top plan view thereof;
FIG. 16 is a right side view thereof [which is a mirror image of the left side] *the left side view being a mirror image* thereof;
FIG. 17 is a rear view thereof;
FIG. 18 is a bottom plan view thereof;
FIG. 19 is a top front and left side perspective view of [an inner frame for a quadruple switch plate] *a fourth embodiment of a switch plate frame showing my new design*;
FIG. 20 is a front view thereof;
FIG. 21 is a top plan view thereof;
FIG. 22 is a right side view thereof [which is a mirror image of the left side] *the left side view being a mirror image* thereof;
FIG. 23 is a rear view thereof; and,
FIG. 24 is a bottom plan view thereof.

1 Claim, 11 Drawing Sheets

Matter enclosed in heavy brackets [ ] appears in the original patent, but forms no part of this reissue; matter printed in italics indicates the additions made by reissue.

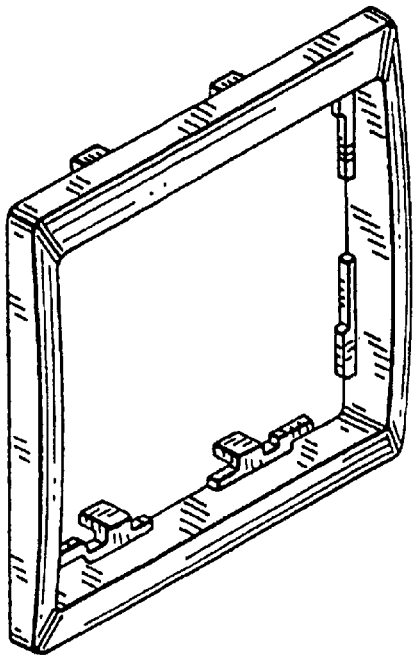
FIG. 1
(AMENDED)
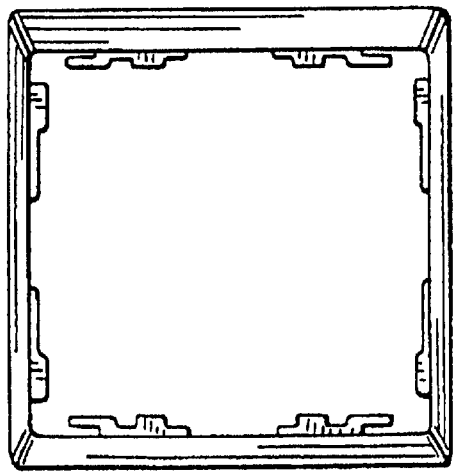
FIG. 2
(AMENDED)

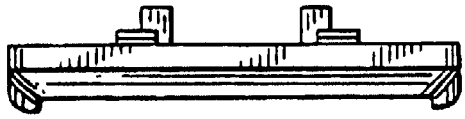
FIG.3
(AMENDED)
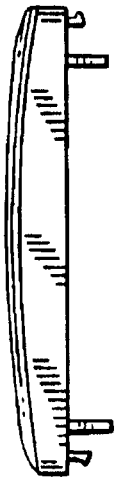
FIG.4
(AMENDED)
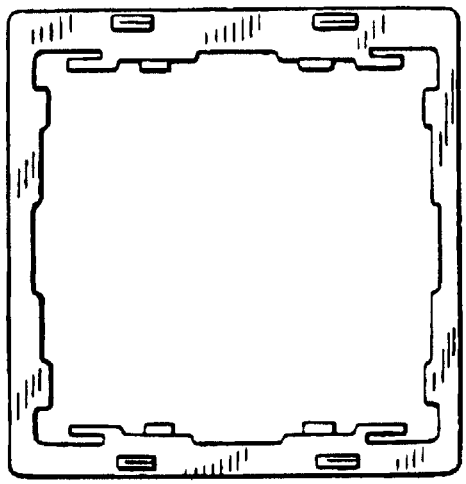
FIG.5
(AMENDED)
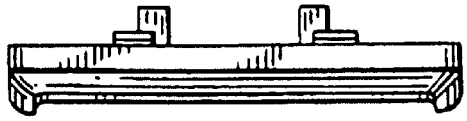
FIG.6
(AMENDED)

FIG. 7
(AMENDED)
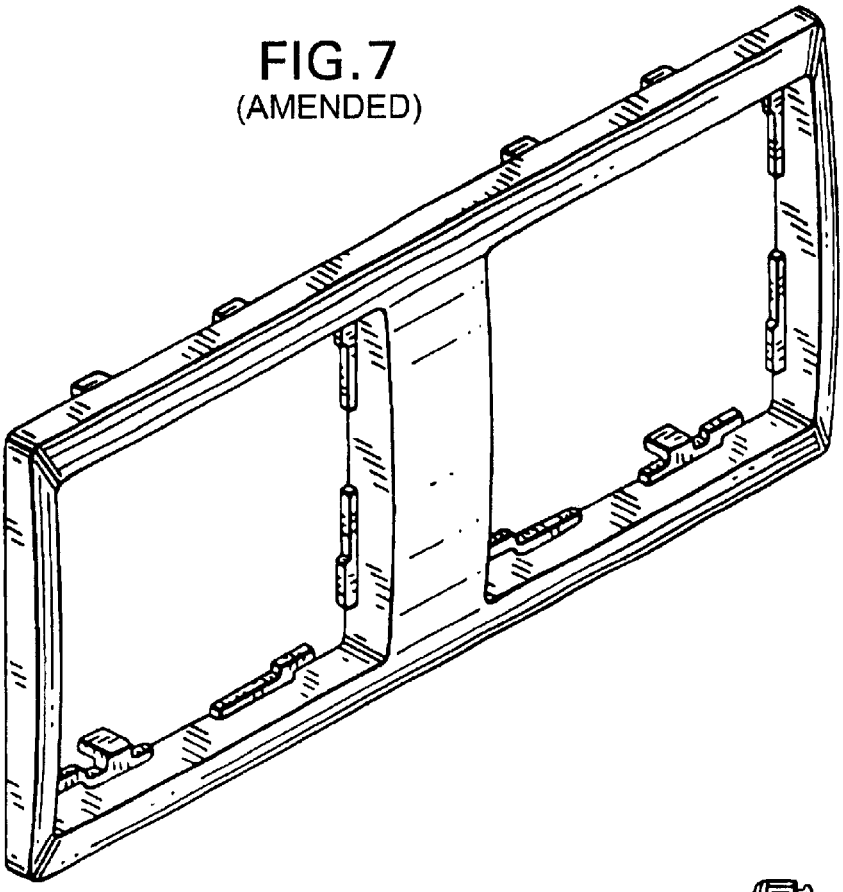
FIG. 10
(AMENDED)
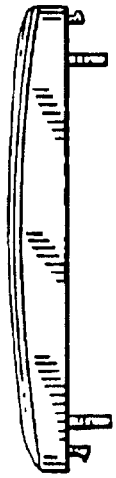

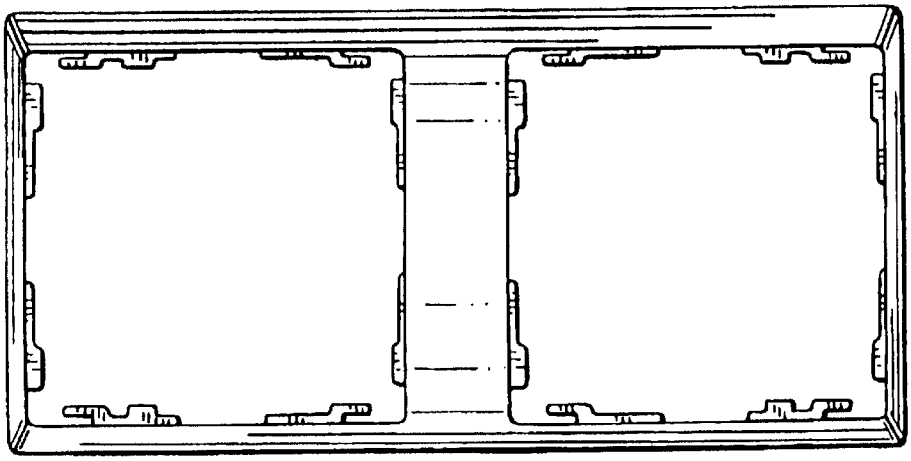
FIG.8
(AMENDED)
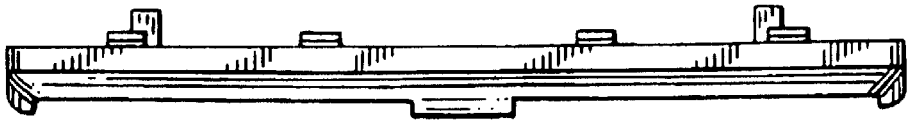
FIG.9
(AMENDED)

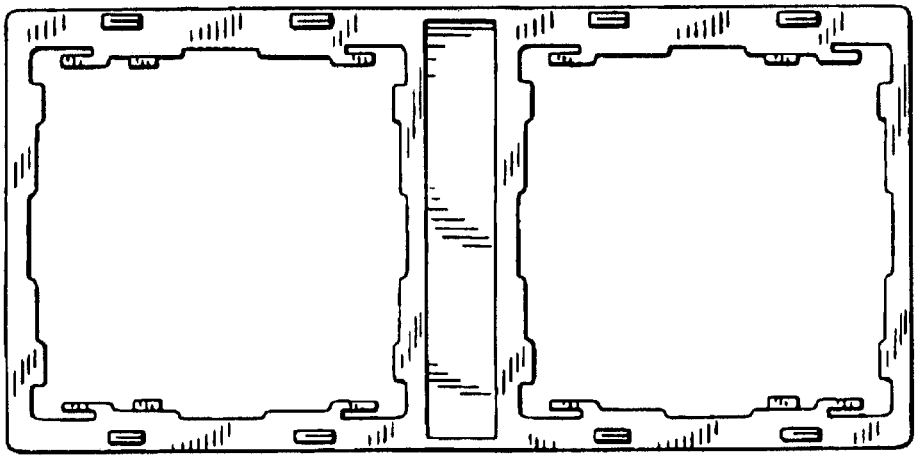
FIG. 11
(AMENDED)
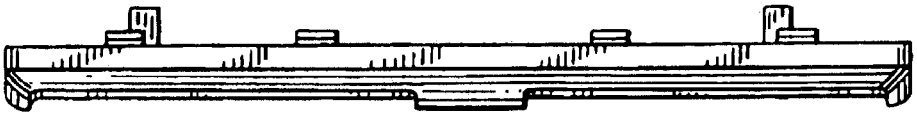
FIG. 12
(AMENDED)

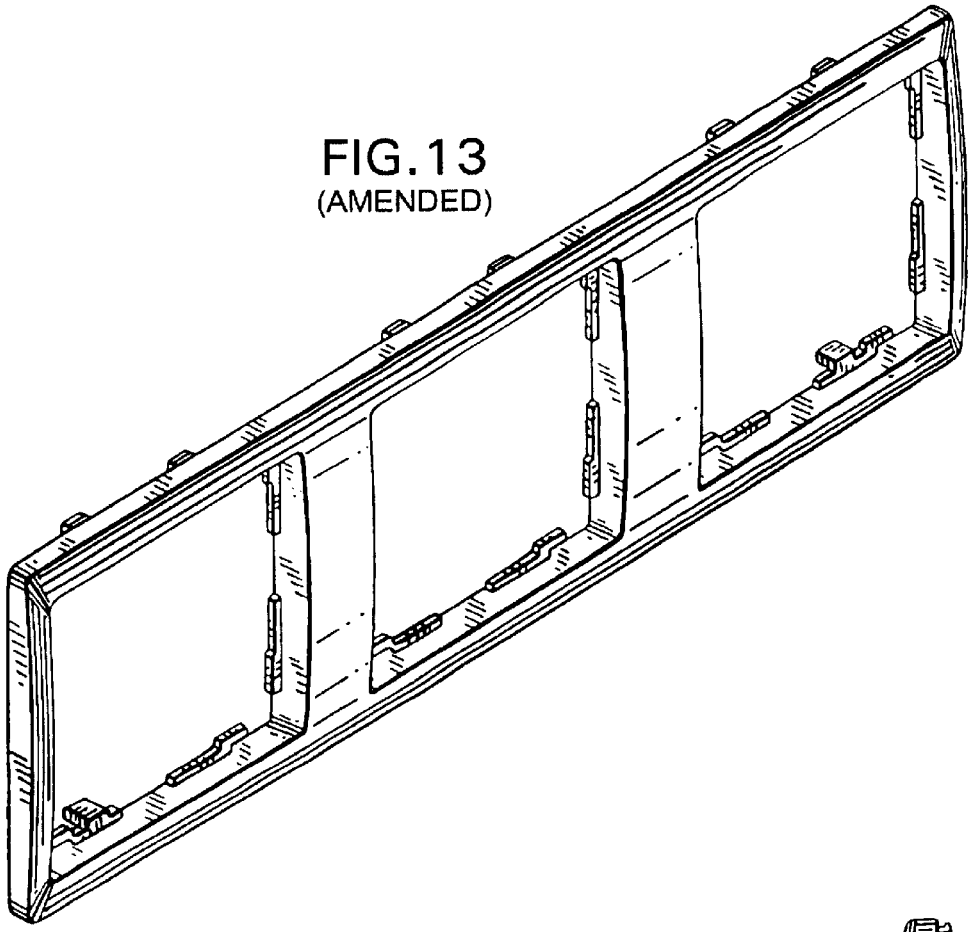
FIG.13
(AMENDED)
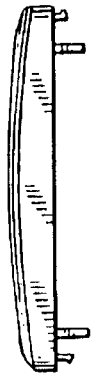
FIG.16
(AMENDED)

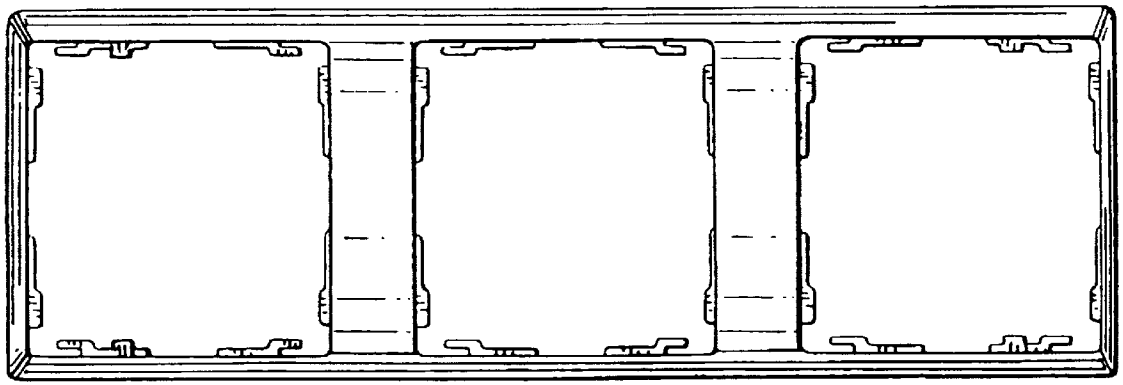
FIG. 14
(AMENDED)
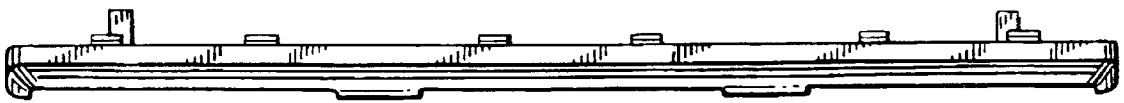
FIG. 15
(AMENDED)

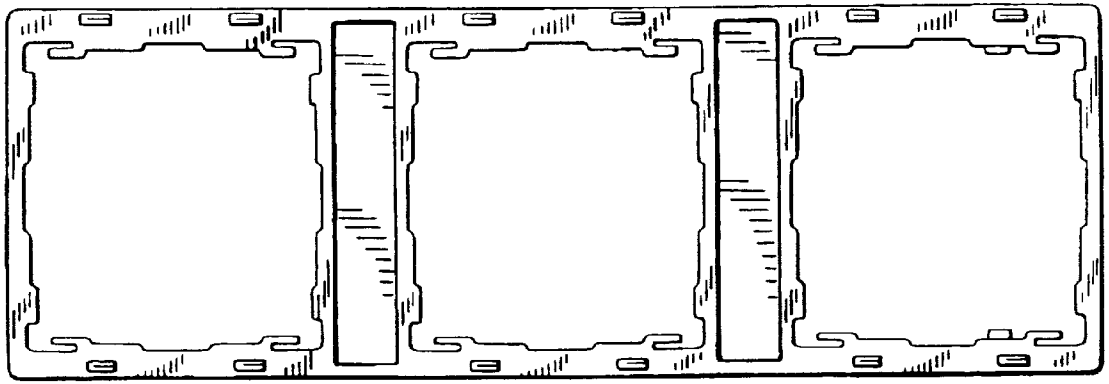
FIG. 17
(AMENDED)
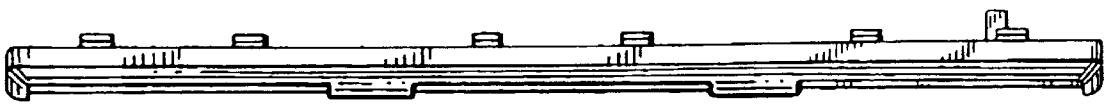
FIG. 18
(AMENDED)

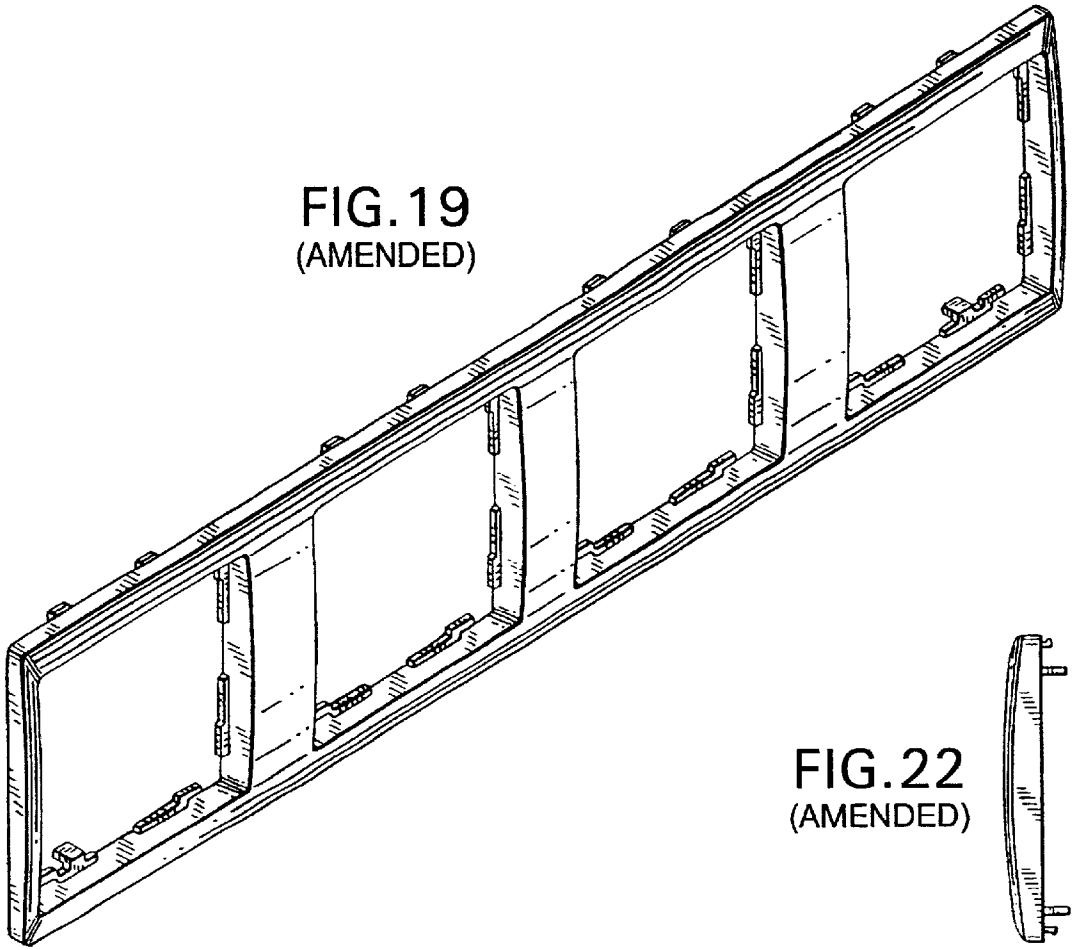
FIG. 19
(AMENDED)
FIG. 22
(AMENDED)

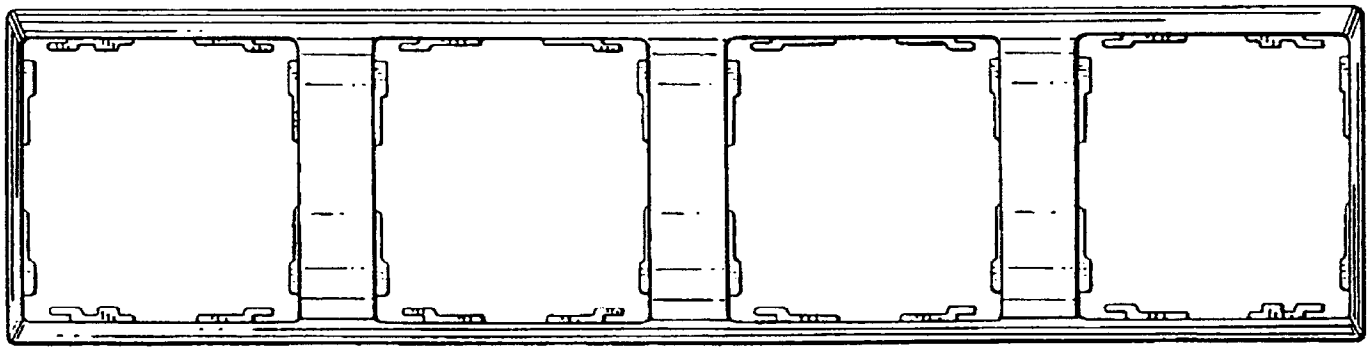
FIG. 20
(AMENDED)
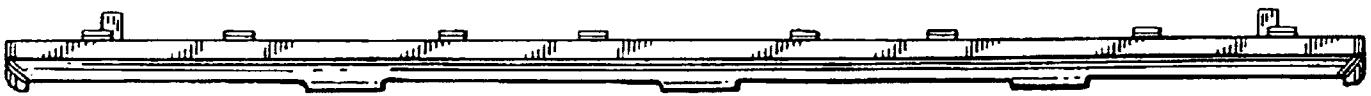
FIG. 21
(AMENDED)

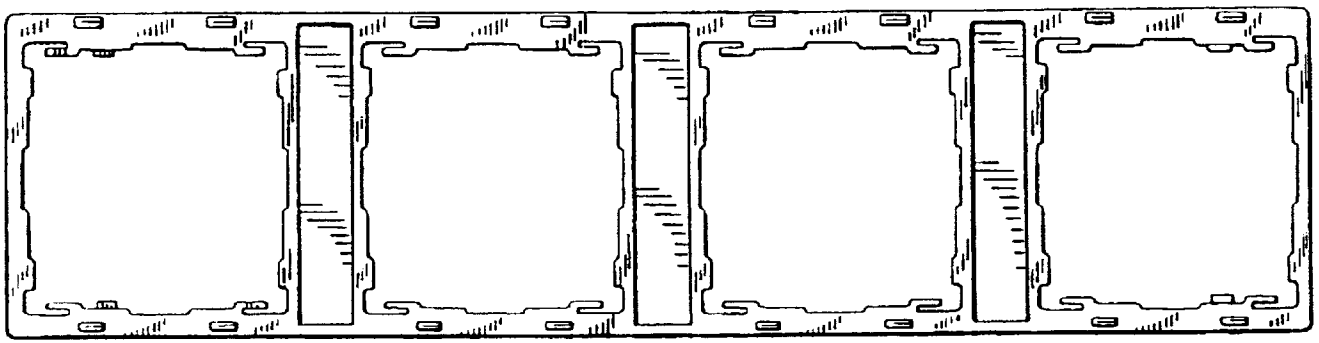
FIG.23
(AMENDED)
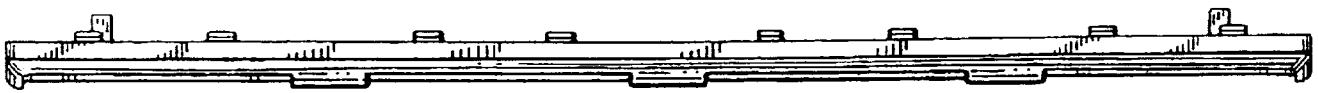
FIG.24
(AMENDED)